United States Patent
Gendo et al.

(10) Patent No.: US 6,607,445 B1
(45) Date of Patent: Aug. 19, 2003

(54) GAME EXECUTION METHOD AND EQUIPMENT USING PLAYER DATA

(75) Inventors: Katsunori Gendo, Tokyo (JP); Kazuhiro Baba, Tokyo (JP); Takashi Iizuka, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/424,912

(22) PCT Filed: Apr. 27, 1999

(86) PCT No.: PCT/JP99/02331

§ 371 (c)(1),
(2), (4) Date: Dec. 1, 1999

(87) PCT Pub. No.: WO99/55438

PCT Pub. Date: Nov. 4, 1999

(30) Foreign Application Priority Data

Apr. 27, 1998 (JP) .............................. 10-116356

(51) Int. Cl.⁷ .............................. A63F 9/24; A63F 13/00
(52) U.S. Cl. ............................. 463/43; 463/1
(58) Field of Search .............................. 463/2, 3, 4, 5, 463/6, 7, 8, 30, 31, 35, 29, 37, 43, 44, 42; 348/500

(56) References Cited

U.S. PATENT DOCUMENTS

| | | | |
|---|---|---|---|
| 4,491,324 A | | 1/1985 | Yoshida |
| 4,679,789 A | | 7/1987 | Okada |
| 5,259,626 A | | 11/1993 | Ho |
| 5,649,862 A | * | 7/1997 | Sakaguchi et al. ............ 463/44 |
| 5,685,775 A | | 11/1997 | Bakoglu et al. |
| 5,720,663 A | | 2/1998 | Nakatani et al. |
| 5,945,988 A | * | 8/1999 | Williams et al. ............ 345/747 |
| 5,961,386 A | * | 10/1999 | Sawaguchi ................... 463/43 |
| 6,095,920 A | * | 8/2000 | Sadahiro ........................ 463/2 |
| 6,110,041 A | * | 8/2000 | Walker et al. ................ 463/20 |
| 6,139,434 A | * | 10/2000 | Miyamoto et al. ............ 463/32 |
| 6,146,277 A | * | 11/2000 | Ikeda ........................... 463/43 |
| 6,231,443 B1 | * | 5/2001 | Asai et al. .................... 463/32 |
| 6,273,822 B1 | * | 8/2001 | Tanaka ......................... 463/43 |

FOREIGN PATENT DOCUMENTS

| | | |
|---|---|---|
| GB | 2118809 A | 11/1983 |
| JP | 9-56927 | 3/1997 |
| JP | 11-154240 | 6/1999 |
| JP | 11-179053 | 7/1999 |
| JP | 11-207036 | 8/1999 |

OTHER PUBLICATIONS

Abstract of JP 08196744, Aug. 6, 1996, Patent Abstracts of Japan, vol. 1996, No. 12, Dec. 26, 1996.

* cited by examiner

Primary Examiner—Kim Nguyen
(74) Attorney, Agent, or Firm—Dickstein Shapiro Morin & Oshinsky LLP

(57) ABSTRACT

A game execution method and game equipment are disclosed. A central processing unit is provided to control the execution of a game program. Information related to a player is employed among a plurality of application programs to control displayed images of a character etc. according to the player's behavior or property. During the execution of the first application program, a player data corresponding to player's input operation is stored into a memory. The player data is then updated according to a player's input operation while the second application program different from the first program is being executed. Also, the player data having been updated by the first program may be updated corresponding to a player's further input operation during the execution of the first program.

12 Claims, 12 Drawing Sheets

GAME EXECUTION METHOD AND EQUIPMENT USING PLAYER DATA

FIELD OF THE INVENTION

The present invention relates to a game execution method and game equipment using player data and more particularly to a game execution method and equipment to control the display of a character etc. during the execution of different application programs using player data corresponding to the property of a player.

BACKGROUND OF THE INVENTION

In recent video game equipment, a method has been introduced to make it possible to suspend the execution of a game program on the way, such as for a roll playing game requiring long time to play. To realize this, such a method is applied in a game program that executed data are recorded at the time of suspension, to restart later the execution of the same game according to the recorded data.

Also, data are recorded in a match game etc. so that the property of a character operated by a player can be changed depending on the game progress. When the same match is executed by the game program afterward, the property of the character operated by the player is determined based on the previously recorded property of the character.

However, in the conventional game equipment where the conventional method of the video game execution is applied, the above-mentioned record of game progress is used for executing the same game program only.

SUMMARY OF THE INVENTION

It is an object of the present invention to provide a game execution method and game equipment by the use of player data, enabling to expand a range of utilization of the stored player data.

It is another object of the invention to provide a game execution method and game equipment enabling to reflect past records of the game execution and a degree of player's skill even in the execution of a different application program.

It is still another object of the invention to provide a method and game equipment enabling to change contents of an operating system based on past records of the game execution and player data.

To attain the above objects, in the present invention, as the first feature, player data corresponding to a player's input operation are stored during the execution of the first program. While the second program which is different from the first program is being executed using the stored player data, the player data are updated according to an additional input operation by the player.

As the second feature of the invention, the player data are updated according to an input operation by the player while the second program is being executed. The player data may be updated further according to a further input operation by the player during the execution of the first program.

As the third feature, there is provided a player interface screen which is displayed by an operating system according to the player data described in the first feature.

As the fourth feature, the second program described in the first feature provides a process data to refer to the stored player data.

As the fifth feature, the player data in the first feature includes an item data selected by the player from an item list during the execution of the first program or the second program. Here, the item list pattern is generated by the program using the above selected result based on a predetermined criterion.

As the sixth feature, the player data include an input operation pattern of the player against an action of a character controlled by the execution of said first program or said second program, whereby a further action of said character is controlled by said program based on a predetermined criterion according to said input operation pattern of the player.

As the seventh feature, while the first program is being executed to control the game execution, the player data corresponding to the player's input operation are stored and maintained, by which the second program produces an image of a specified character to display during the execution of the first program.

As the eighth feature, in the case that the first program is to control the execution of a match game, the specified character described in the seventh feature is displayed as an opponent to the character operated by the player.

As the ninth feature, the specified character described in the seventh feature is made possible to change an appearance according to the player's input operation.

Further scopes and features of the present invention will become more apparent by the following description of the embodiments with the accompanied drawings.

DESCRIPTION OF THE PREFERRED EMBODIMENTS

The preferred embodiment of the present invention is described hereinafter referring to the charts and drawings, wherein like numerals or symbols refer to like parts.

Figure 1:
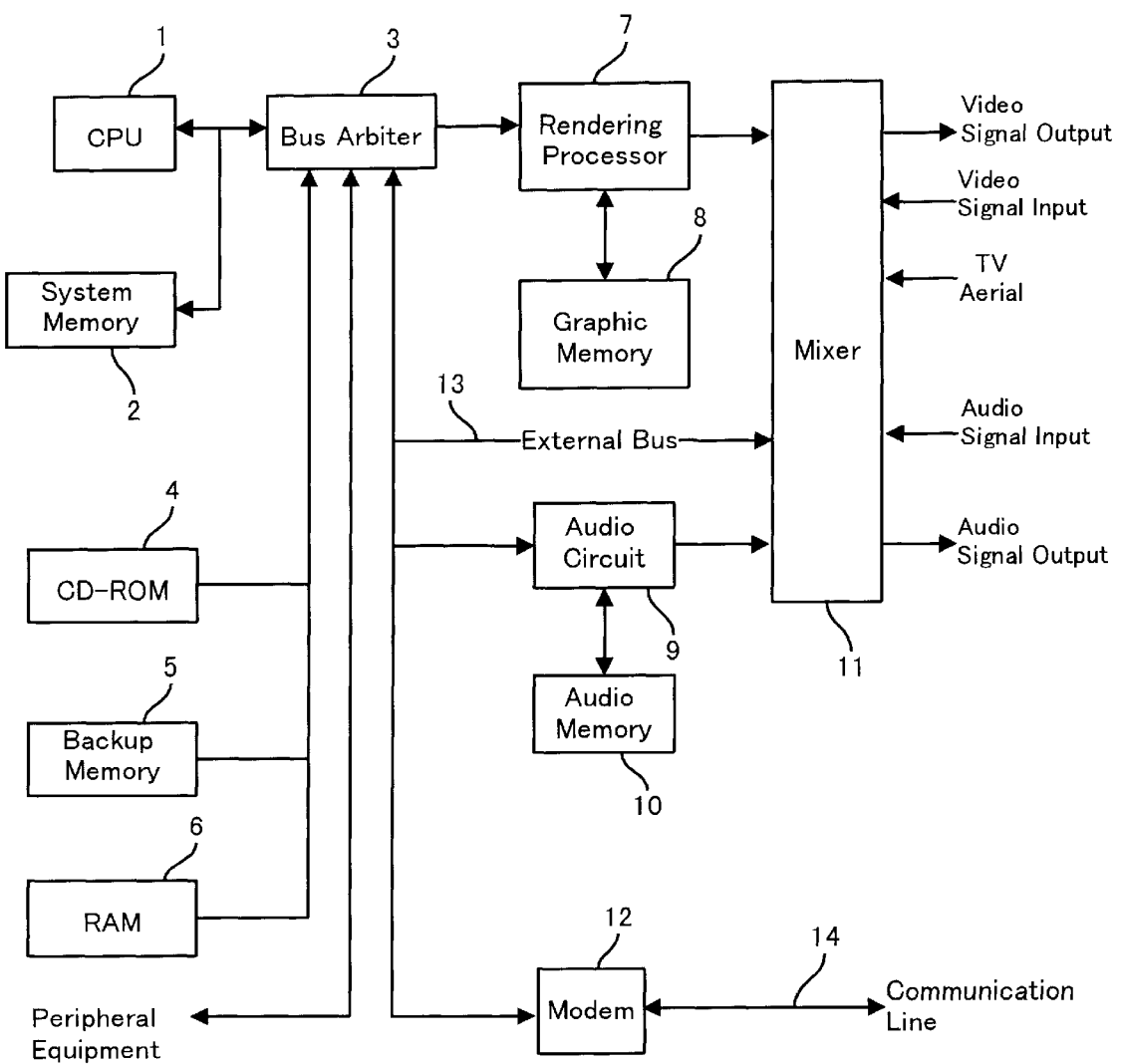
FIG. 1 shows a configuration block diagram of game equipment to execute a game program according to the present invention.

FIG. 1 shows a block diagram of game equipment to execute a game program in accordance with one embodiment of the invention. When power is turned on, a central processing unit (CPU) 1 as a control means initiates a boot program attached to CPU 1. BY the boot program, CPU 1 reads out an operating system (OS) stored in a system memory 2 into a random access memory (RAM) 6, and then executes the operating system.

By means of the operating system, CPU 1 reads out and executes an application program stored in CD-ROM 4. Data produced during the execution of the application program are stored into a backup memory 5 according to the invention. CPU 1, CD-ROM 4, backup memory 5 and RAM 6 are mutually connected through a bus arbiter 3. Bus arbiter 3 controls to assign a bus occupation time of each part of equipment connected through a bus.

To the bus arbiter 3, a rendering processor 7 is also connected. Rendering processor 7 has such function as pasting texture data onto an image for display and processing images which include priority data, then store image data for a screen frame into a graphic memory 8.

The image data stored in graphic memory 8 are inputted to a mixer 11. On the other hand, an audio circuit 9 connected to bus arbiter 3 performs such a process as the digital-to-analogue conversion of audio signals, to output to mixer 11 as audio data. An audio memory 10 is used for an audio buffer in audio circuit 9.

The image data and the audio data inputted to mixer 11 are transferred to a video monitor or a speaker (not shown). Video signals and audio signals are also inputted from external circuits to mixer 11. These signals are fed to bus arbiter 3 through an external bus 13. Bus arbiter 3 is also connected to a communication line 14 through a modem 12.

Figure 3:
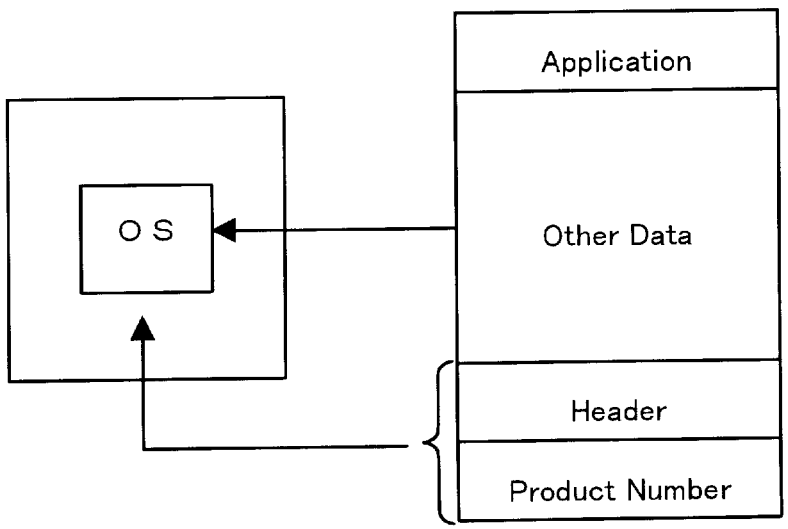
FIG. 3 shows a chart to illustrate a configuration of an application program.

Operations performed in the aforementioned game equipment is described hereafter. FIG. 3 shows a configuration of a conventional application program. The application program has a header followed by a product number data. Other data part is a main body of the application program.

In the conventional application program shown above, the header and the product number data are read out by the operation program (OS) for performing a security check. Furthermore, the other data i.e. the application program is read in to be executed by CPU 1 under the control of the operation program (OS).

Figure 2:
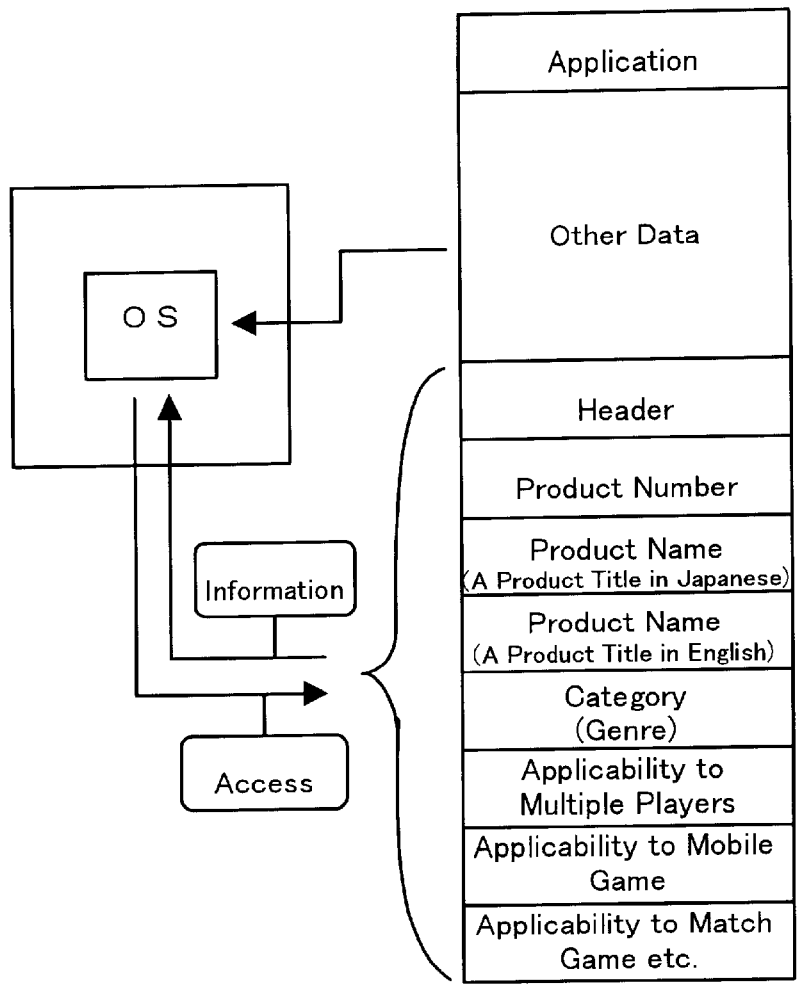
FIG. 2 shows a configuration of an application program according to the invention.

In FIG. 2, there is shown a configuration example of an application program in accordance with the present invention. In this example, in addition to a header followed by a product number data, a product name (a program title in Japanese and English), a category (genre) of the game, applicability to multiple players, applicability to mobile game, applicability to match game, etc. are provided.

The above information is, as explained later, accessed by the operating system and stored in RAM 6. Now, the basic features of the present invention will be described referring to the operation flow shown in FIG. 4.

Figure 4:
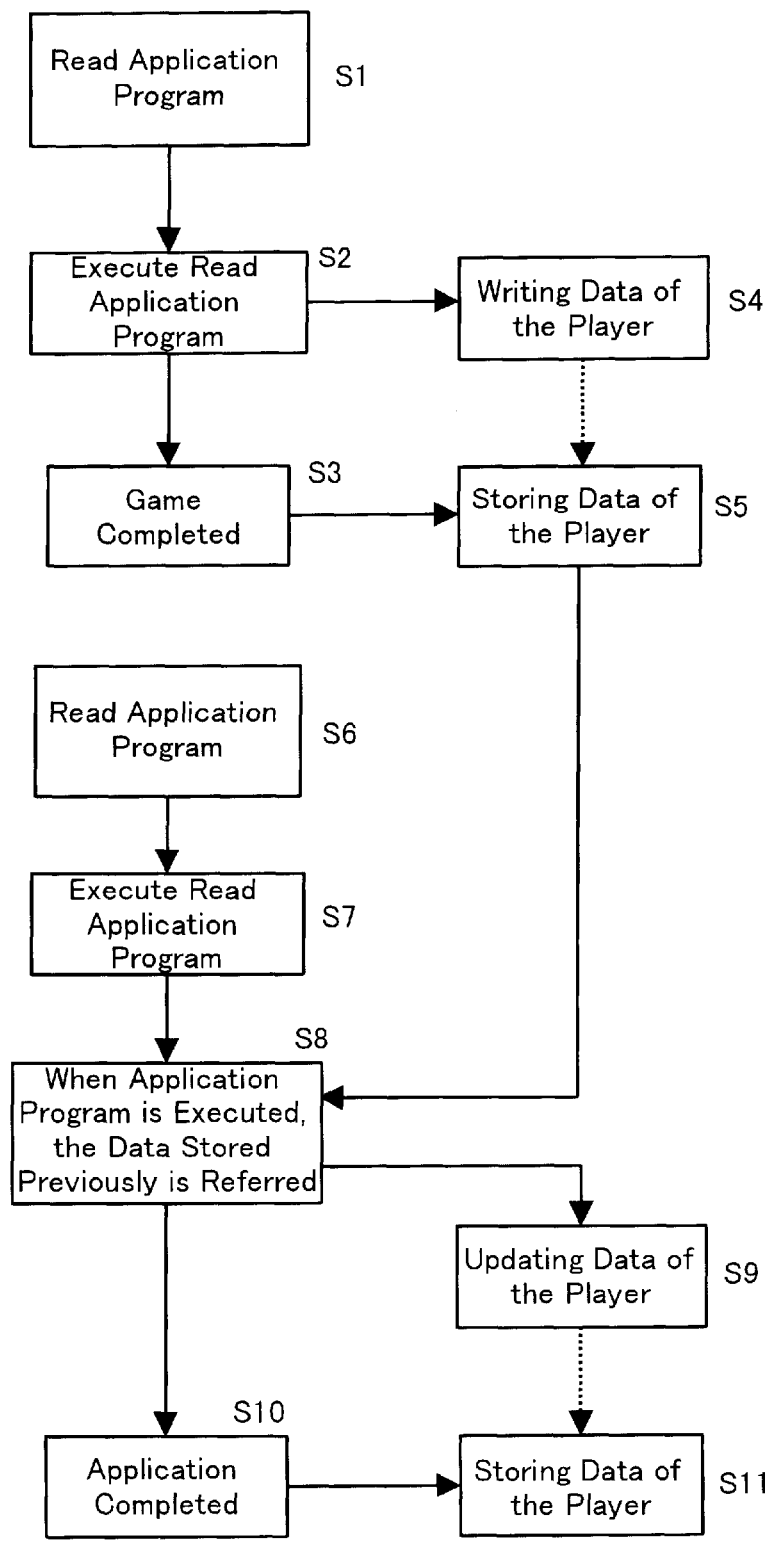
FIG. 4 shows an operation flow to illustrate the basic features of the invention.

In FIG. 4, as explained before, when operation of the game equipment is initiated, the first application program is read into RAM 6 from CD-ROM 4, etc. by the operating system stored in system memory 2 (step S1).

Then, the first application program stored in RAM 6 is executed by CPU 1 (step S2). According to the invention, while the game is being performed by the execution of the application program, data generated by the operation of the player (or players) are stored in RAM 6 (step S4).

Furthermore, on completion of the game (step S3), the player is stored in backup memory 5 (step S5). The stored data correspond to the product number data and the following items in FIG. 2, which will be explained in detail later.

As a feature of the invention, a situation is considered that the second application program is executed after the first application program was completed. The second application program is newly read into RAM 6 (step S6) and is executed by CPU 1 (step S7) which is similar to the case of the first application program.

Here, as a feature of the invention, the second application program may be different from the first application program which was previously executed.

When the second application program having been read into RAM 6 is executed (step S7), the player data which was previously stored into backup memory 5 is read out and is referred during the execution of the second application program. The player data is updated according to the player's input operation (step S8).

In other words, the second application program read out in step S6 includes a control program which uses the additional information such as the product number data etc. as explained in FIG. 2.

The information which was generated according to the player's input operation during the game process by the first application program and stored as the player data into backup memory 5 in step S5 is then read out.

The game proceeds, as the control program in the second application program refers to the read-out information to reflect to the process. In the event of the player's input operation during the execution of the second application program, the player data is updated and stored into RAM 6, as in the previous case (step S9).

On completion of the second application program (step S10), the player data stored in RAM 6 is saved to backup memory 5 (step S11).

This data is used afterward, when the same or a different application program is read to resume the game.

In addition, in the operation flow described in FIG. 4, the player data are stored in RAM 6 during the game execution and are saved to backup memory 5 at the time the game is completed. It may also be possible that the player data be saved into backup memory 5 at an arbitrary time.

Figure 5:
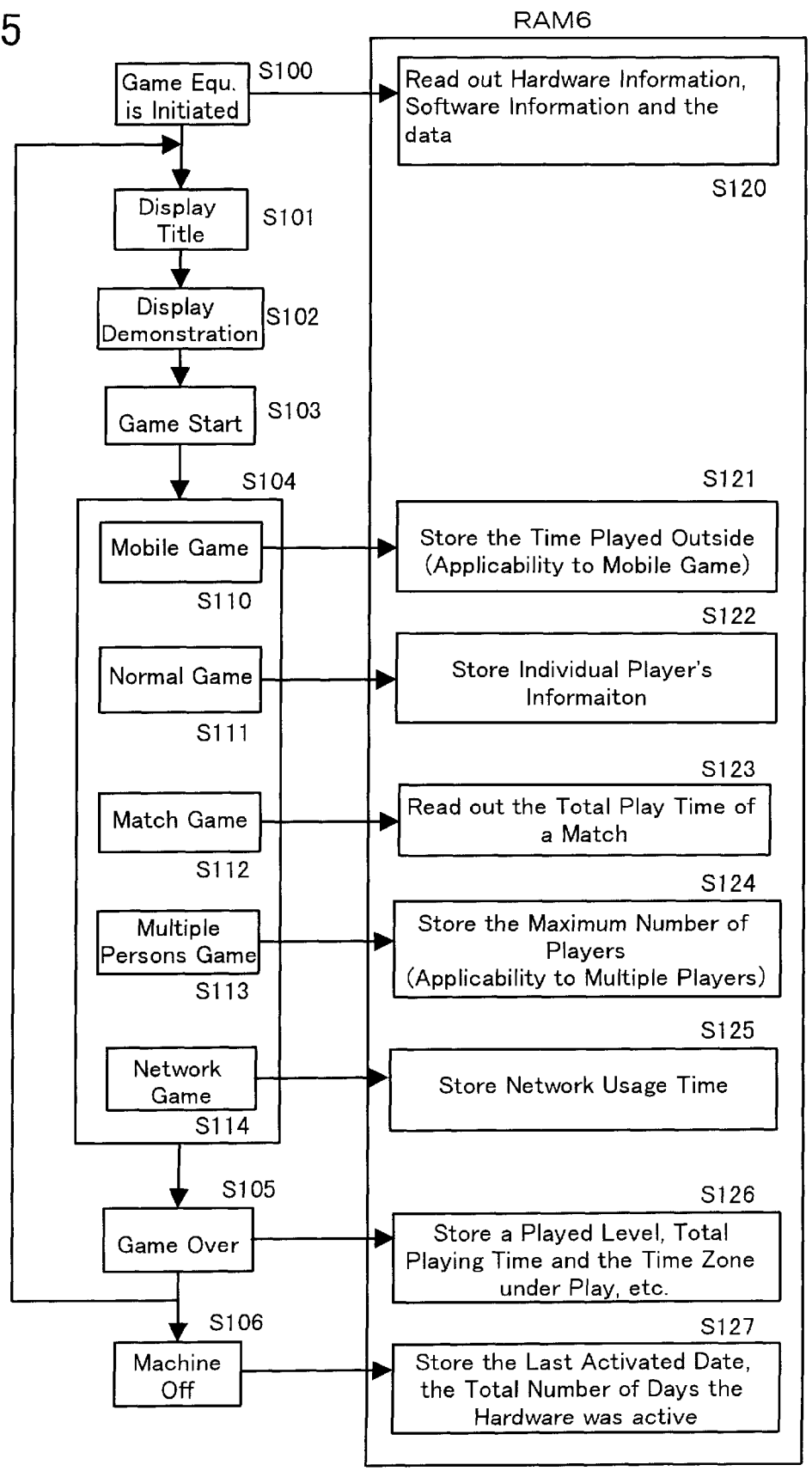
FIG. 5 shows a chart to illustrate a player data stored and maintained in a backup memory 5 in the operation flow shown in FIG. 4.

In FIG. 5, there is shown a storing process of the player data into backup memory 5 (step S4) and a saving process of the player data (step S5) in the operation flow in FIG. 4.

An example of the player data in accordance with the steps of the operation flow is shown in FIG. 5, together with the operation flow.

When the game equipment is initiated (step S100), hardware information, software information and the data read from backup memory 5 are read out, as basic information, and transferred to RAM 6 by the operating system (step S120).

Some of the above data were already inputted and stored in RAM 6 before initiating the equipment.

The hardware information includes a hardware serial number and a country number, which are stored in system memory 2 of the game equipment.

The software information includes the first initiated date, and, as already explained in FIG. 2, a product number data, a category of the game, a product name (a title in Japanese and in English) and so on, following a header.

In addition, as player data, there are data related to the player and collected in the game execution carried out so far, such as the time played and the number of the execution. Also the player data includes the player's age, date of birth and gender which were inputted by the player when the game was initiated for the first time.

At the time the game equipment is initiated, peripheral equipment currently connected is verified for use by the system program stored in the system memory 2. Then, the title is displayed by the operating system (OS) (step S101), and also the demonstration of the game is displayed (step S102).

Then, a game is started according to a command inputted by a player (step S103). According to the invention, player data are stored in RAM 6 during the game play (step S104). The player data differs depending on the kind of the games executed. For example, in the case of a mobile game (step S114), the time played outside is stored as one of the player data (step S115).

In the case of a normal game (step S111), individual player's information such as favorite food and disliked food, weak point against attack and strong point, etc. are stored in RAM 6 as the other player data (step S122).

Such player data as described above are obtained by player's selection of items regarding favorite and disliked food etc. while the first application program or the second application program mentioned earlier is being executed.

Also, data related to the weak point and strong point against an attack to the player etc. are obtained from the player's input operation pattern (i.e. input operation characteristic) against motions of the program controlled character during the execution of the first application program or the second application program.

When the game is played by multiple persons (step S113), the maximum number of players having operated and the total time played by multiple persons are stored in RAM 6 (step S124). Furthermore, in the case a game is played through a network (step S114), the network usage time is stored (step S125).

On completion of the game, a played level, total playing time and the time zone under play, etc. are stored (step S126).

Further, when the power of the game equipment is turned off (step S106), the last activated date, the total number of days the hardware was active and the number of peripheral equipment having been used are stored (step S127).

In FIG. 5, when the power of the game equipment is turned off, the player data stored in RAM 6 is saved into backup memory 5.

Figure 6:
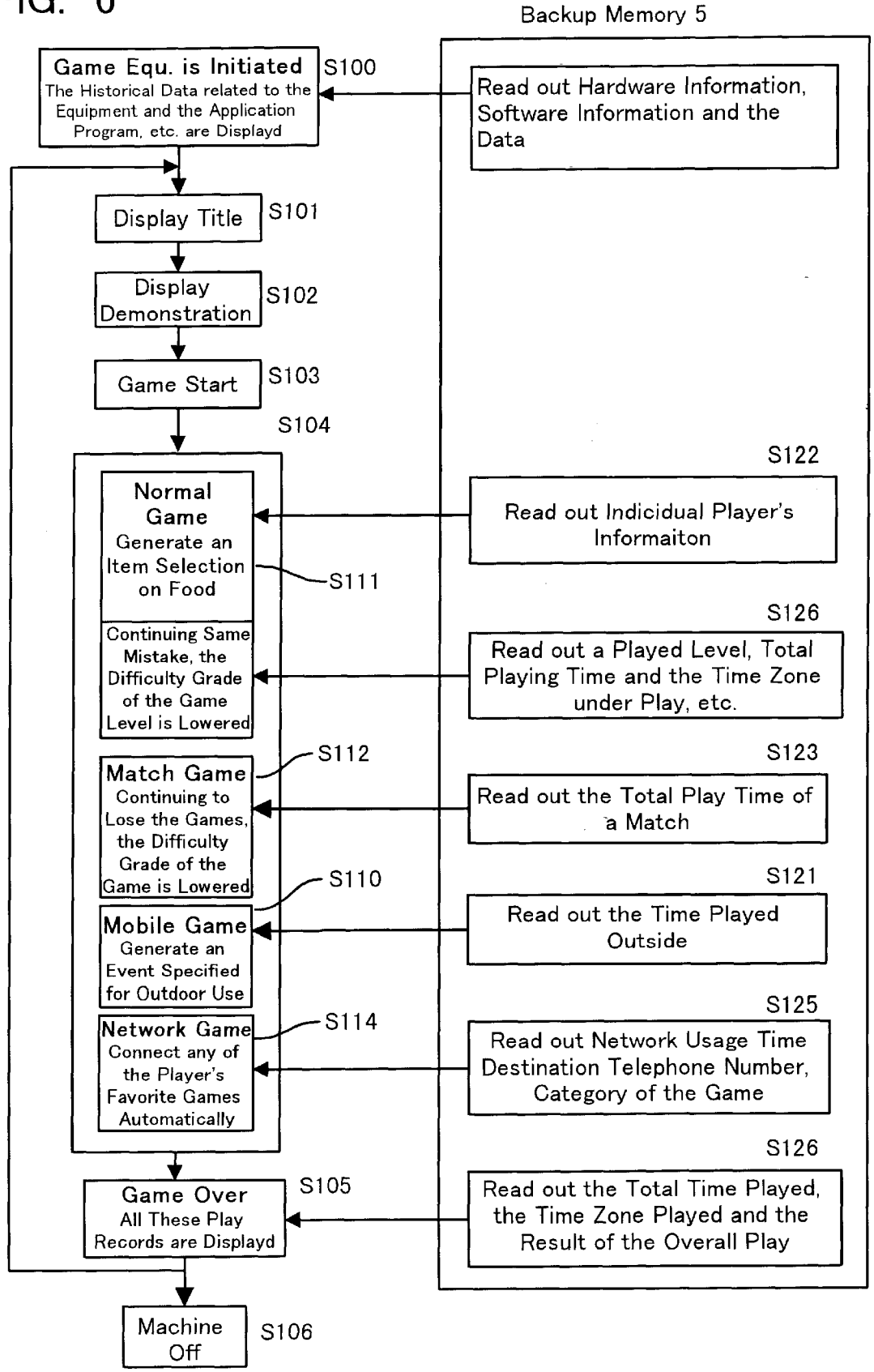
FIG. 6 shows an operation flow to illustrate an example of using player data stored and maintained in backup memory 5 in FIG. 5.

Referring to FIG. 6, there is illustrated the operation flow on an example of how the player data saved in backup memory 5 as in FIG. 5 is used. In FIG. 6, when the game equipment is initiated (step S100), the hardware and software information as a basic information, and the player data are read out from backup memory 5. Then the historical data related to the equipment and the application program, etc. are displayed.

Then, as illustrated in FIG. 5, the game title is displayed by the application program (step S101) followed by the demonstration display of the game (step S102).

In the demonstration display, the player data mentioned above affects the interface to the operating system (OS), which in turn affects the content of the demonstration display. The changed interface to the operating system (OS) may also be reflected to the images displayed during the succeeding program execution. As mentioned earlier, the second (or subsequently executed) application program may be different (although not necessarily) from the first (or previously executed) application program.

Figure 7:
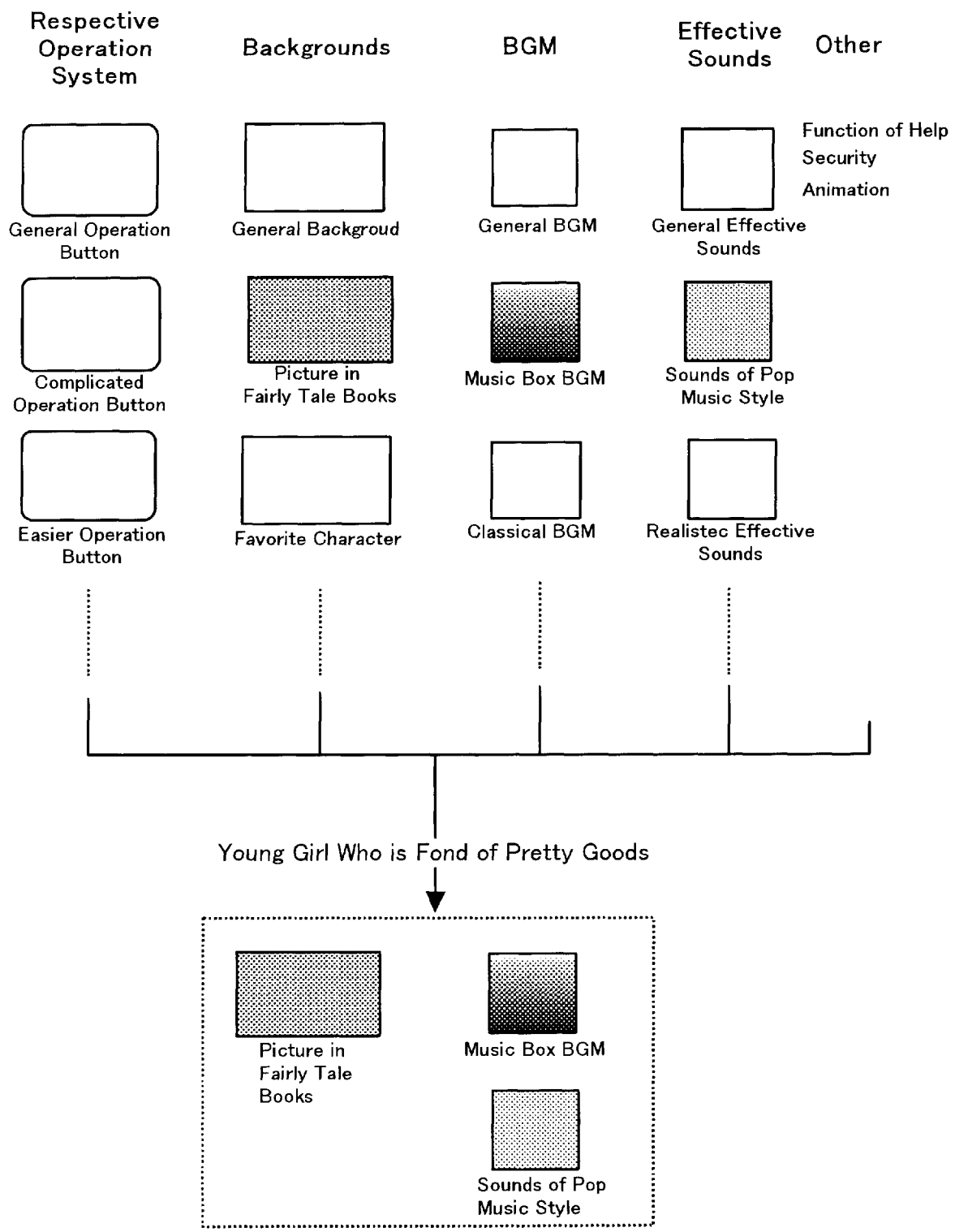
FIG. 7 shows an interface of an operating system (OS).

An example of interface to the operating system (OS) is shown in FIG. 7. Corresponding to the respective operation system, backgrounds, background music (BGM), effective sounds, etc., data related to a plurality of content categories are provided in system memory 2.

Those data are combined to use based on the player data. In the example shown in FIG. 7, from the data of the player's gender and the age, the player is assumed to be a young girl who is fond of pretty goods. In this case, a picture which may often been seen in fairly tale books is selected as a background, a sound generated by a music box is selected as a BGM, and a sound of pop music style is selected as effective sounds.

Then, triggered by a player's input, the game is started (step S103). On the start of the game execution (step S104), the player data stored in backup memory 5 is used depending on the selected game. In other words, the application program has a function to control to read the player data which is supposed to be stored in backup memory 5 to use at the time of program execution.

In the normal game (step S111), as an example, a scene is supposed in which a character whose action may be controlled by the player is going to select items such as foods. The program reads out data on foods the player likes or dislikes from the player data to be selected according to a certain criterion, to generate an item selection pattern on food.

In another example (step S126), the player data related to the player's playing level, the total time played, the time zone played, etc. are read out. For example, when the player continued to make the same operational mistake for certain times, the program controls to change the difficulty grade of the game level to an easier level to reflect into the actual game process. Then the program updates the information on the player's game play level stored in backup memory 5.

In still another example of the match game (step S112), the total play time of a match, the record data of past matches, etc. are read out (step S123). For example, when the player continued to lose the games, the difficulty grade of the game is controlled to make lowered. In the case that actions of an opponent character are controlled by a program, while actions of the player's character are operated by the player himself, the player data related to the input operation against actions of the opponent character is read out.

The program controls the movement of the opponent character corresponding to the input operation pattern by the player, based on a predetermined criterion. For example, when the player's playing level is found immature after checking the player data related to his input operation, the program controls the action of the opponent character in such a way that the action the player is good at can easily be derived. On the contrary, when the player's level is high, the opponent character's action is controlled so that patterns to attack the player's weak point are frequently used.

In another example of a mobile game (step S110), the data of the time played outdoors is read out (step S121) to control to generate an event specified for outdoor use at an appropriate time.

Furthermore, in a game designed for use with a communication network (step S114), a data of the time played using network is read out (step S125). A data of a destination telephone number and a data related to the category of the game are also read. Based on these data, any of the player's favorite games (which are estimated from the game category in which a large amount of time has been consumed) is connected automatically by the program.

At the time of the game is ended (step S105), the total time played, the time zone played and the result of the overall play are read out (step S126) and all these play records are displayed.

After that, the power off process of the equipment is carried out (step S106).

Figure 8:
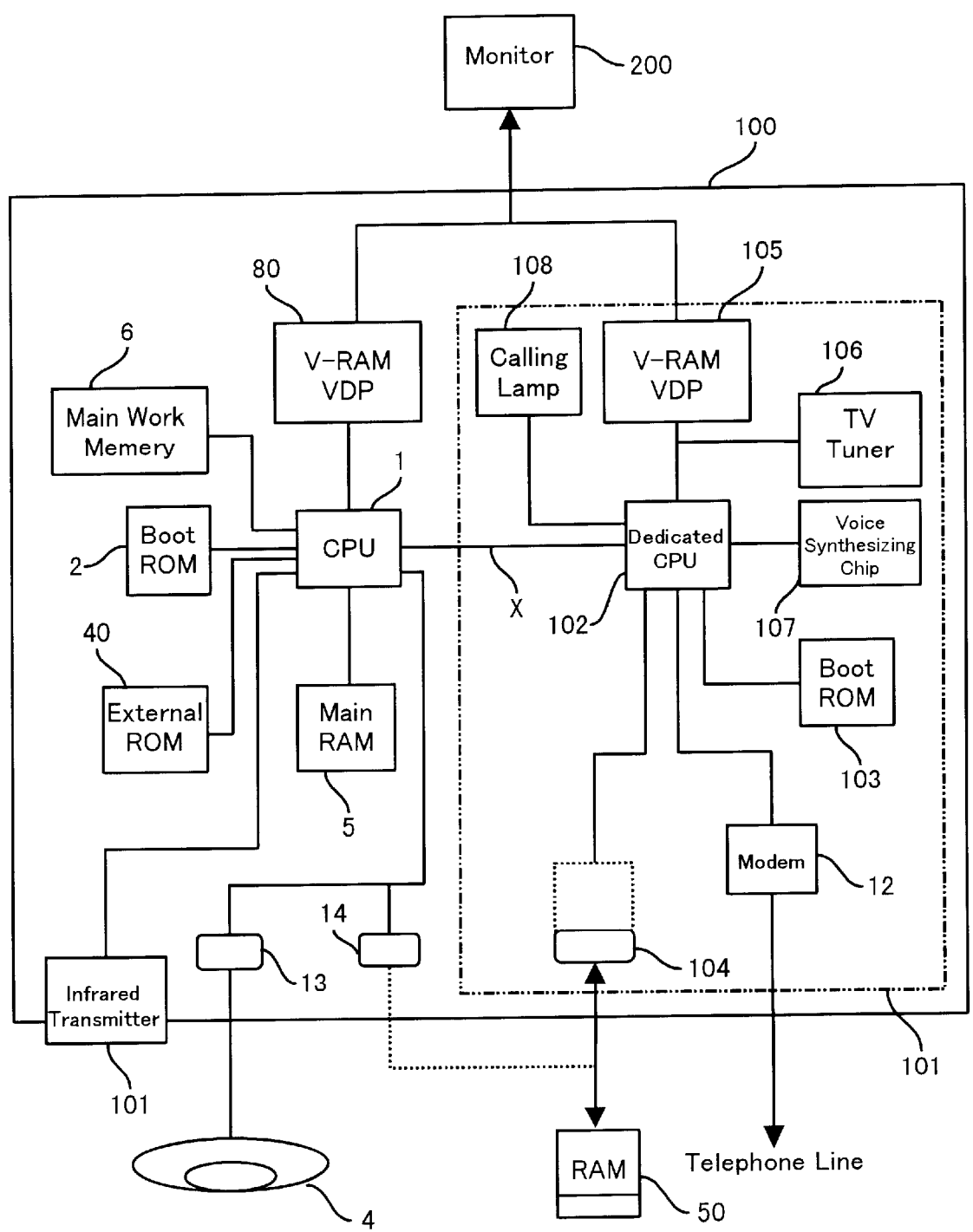
FIG. 8 shows another embodiment of a configuration of game equipment according to the invention.

FIG. 8 shows another embodiment of the game equipment in accordance with the present invention. Game equipment 100 includes a monitor 200, a CD-ROM 4 connected through a connector 13, a backup RAM 50 for saving player data connected through a connector 14. Furthermore, an infrared transmitter 101 to connect to external equipment, telephone line etc. are also included.

In the internal part of the equipment 100, there are provided elements shown in FIG. 1 as a basic configuration. Namely, CPU 1 as a control means has a connection with a boot ROM 2 for storing a boot program for initiating the equipment, and a main work memory 6. Application programs are fed into CPU 1 from an external ROM 40 such as a cassette memory, or CD-ROM 4.

As a backup memory, a main RAM 5 is used for storing player data. In the case backup RAM 50 is used instead of main RAM 5, RAM 50 is connected to connector 14 depending on a player's choice.

According to an application program controlled by CPU 1, an image data generated by a rendering processor 7 and an image processing circuit 80 which includes a graphic memory 8 is fed as a screen display data to be supplied to monitor 200.

The equipment shown in FIG. 8 further includes an extension board 101. Extension board 101 has a dedicated CPU 102. In a ROM 103, an operating system corresponding to dedicated CPU 102 and an extension program are prepared.

The extension program is executed by dedicated CPU 102 to control, for example, the display of a specified character image (hereinafter called by a nickname of 'Hermit').

An image of Hermit, which is fed to a image processing circuit 105 similar to image processing circuit 80, is superimposed on an image generated by the application program executed by main CPU 1. The above produced image is displayed on monitor 200.

The image of Hermit is generated by the extension program stored in a ROM 103, as linked with player data stored in backup memory 5, as illustrated before in FIG. 5.

The player data stored in main RAM 5 can be accessed from dedicated CPU 102 by connecting main CPU 1 in equipment 100 with dedicated CPU 102 in extension board 101 through a bus X.

Otherwise, backup RAM 50 is connected to connector 14 of equipment 100 to store the player data. By connecting RAM 50 with connector 104 of extension board 101, RAM 50 can directly be accessed by dedicated CPU 102 when extension board 101 is used. Thus the player data becomes accessible from dedicated CPU 102.

In FIG. 8, extension board 101 also has a modem 12 to connect to a communication line such as a telephone line. A calling lamp 108 is used to inform the player when a call from an opponent player is originated.

In addition, TV broadcast can be received using a TV tuner 106. A voice synthesizing chip 107 is a circuit to synthesize analog voice signals from digital signals during the program execution. The synthesized voice signals are outputted to a speaker (not shown).

Figure 9:
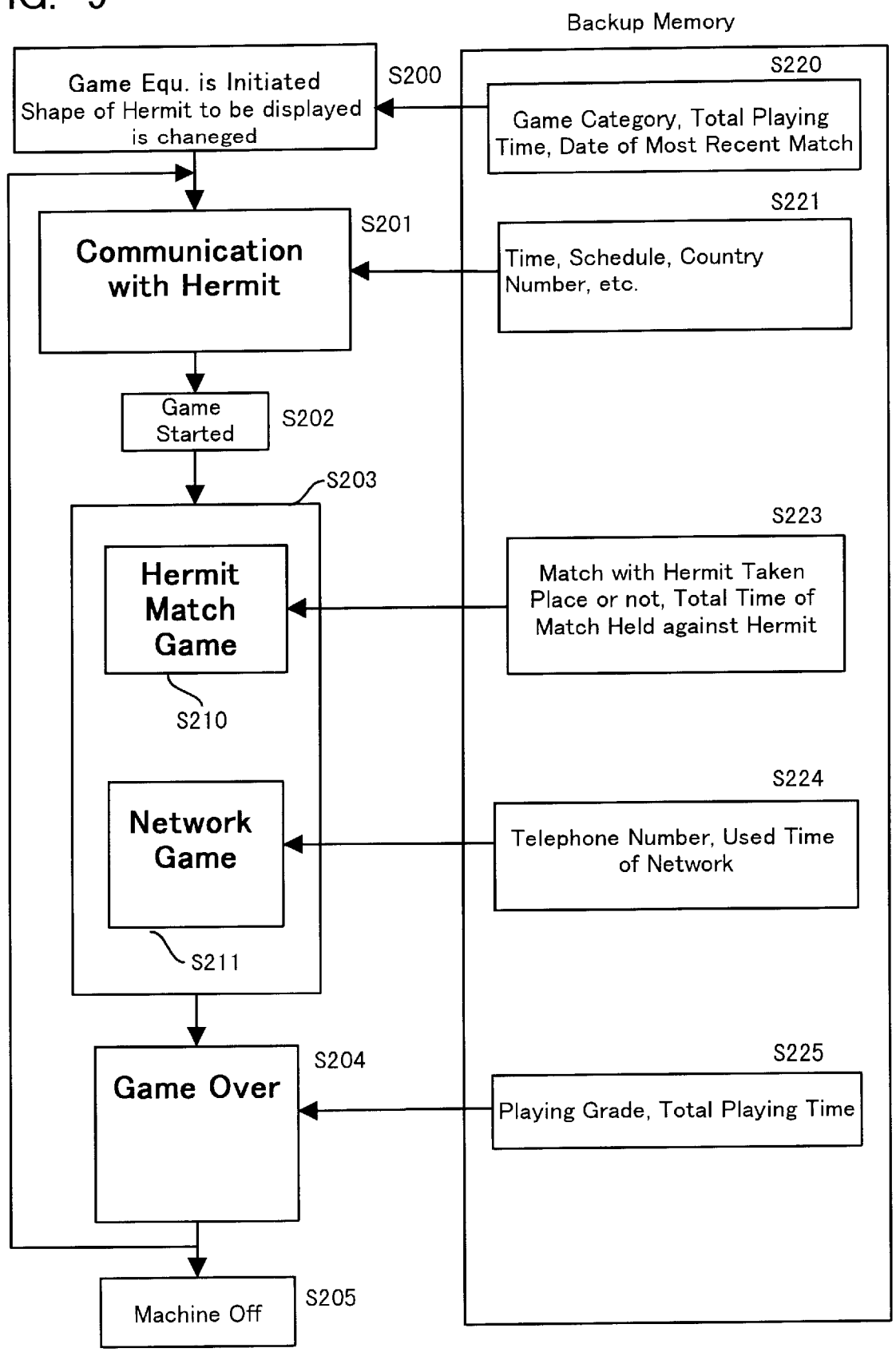
FIG. 9 shows an example of an operation flow in the game equipment shown in FIG. 8.

FIG. 9 shows an example of the operation flow in the game equipment shown in FIG. 8. It should be noted that, when the game equipment is initiated, dedicated CPU 102 executes the extension program stored in ROM 103.

The extension program reads out player data accumulated in the past games, and changes the shape of Hermit to be displayed to the screen of monitor 200 (step S200) based on the player data.

In more detail, the extension program reads out the category of the game, the total playing time, the date of the most recent match, etc. from backup memory 5 or 50, to change the shape of Hermit to be displayed to monitor 200.

Then, the following player data are read out: the initiated time; the schedule; the country number; the date of the first initiation; the number of initiations; the player's name, age and gender; the result of the recent five matches; the time duration of facing with Hermit, and soon (step S221). The player can communicate with Hermit to obtain the above information (step S201).

For example, Hermit speaks synthesized voice generated by voice synthesizing chip 107, telling the player the current time, today's schedule, player's name, etc. Various appearances of Hermit are displayed in the initial pictures such that Hermit talks to the player with emotion.

When the game is started (step S202), the game program stored in external ROM 40 or CD-ROM 4 is executed by CPU 1.

When the game is a match between the player and Hermit (step S210), CPU 1 issues an order to dedicated CPU 102 in extension board 101 through bus X to read out the player data from the backup memory to transfer to CPU 1. The above process is carried out based on the game program of the match against Hermit. These data include the history whether a match with Hermit was ever taken place or not, the total time of the match held before, the date of the most recent match, the collected result of all matches held, the record of the recent five matches, etc. (step S223).

Based on a program executed by CPU 1, a control command is sent from CPU 1 to dedicated CPU 102. In response to the control command, dedicated CPU 102 controls to display the aspect of Hermit so that Hermit attacks the character operated by the player while the match game against Hermit is being executed. The above control is carried out using the past record of the matches against Hermit stored in the player data which were read out in advance.

In the case of a network game (step S211), the following process is carried out based on a network game program. CPU 1 reads out from backup memory 5 the destination telephone number, the time of a network in use, the category of the game, the product name (game title) (step S224) to transfer to dedicated CPU 102 in extension board 101 through bus X.

Then, based on the network program executed by CPU 1, a control command is sent from CPU 1 to dedicated CPU 102. In response to the control command, dedicated CPU 102 automatically connects the line through a modem either to a network host, a favorite game, or to an opponent of the game which has been selected using the player data obtained in advance (step S211).

On completion of the game (step S204), dedicated CPU 102 receives from CPU 1 the player data on his play level and the total playing time (step S225). Then, dedicated CPU 102 controls to display to the player the result of the play and some hints for further play according to the player's level. It is displayed like Hermit teaches the above to the player.

At the time the equipment is shut down, it is controlled so that Hermit tells the player a schedule of the following day.

As described above, based on either the extension program or the control of CPU 1, dedicated CPU 102 in extension board 102 controls the display of Hermit, to feed the display image data of Hermit to a video RAM in image processing circuit 105. At the same time, other image data for display generated by CPU 1 are developed to a video RAM in image processing circuit 80.

These image data fed into video RAM 105 and video RAM 8 are superimposed to display on monitor 200.

Figure 10:
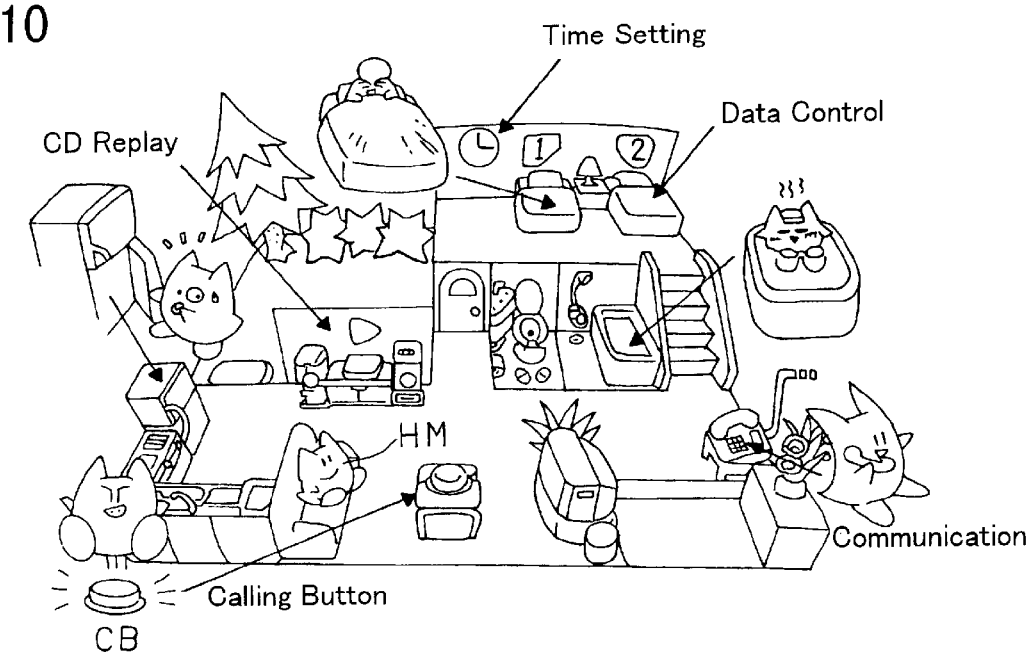
FIG. 10 shows an example of an initial menu screen which is displayed after the equipment is initiated in the flow shown in FIG. 9.

FIG. 10 shows an example of an initial menu screen which is displayed after the equipment is initiated by the extension program stored in ROM 103 of extension board 101 (step S200) in the operation flow in FIG. 9. Each menu item displayed in the menu screen is executable under the control of the extension program.

When a player clicks a mouse on a calling button CB, Hermit HM appears in the menu screen. On putting the mouse pointer on each menu item in the menu screen, such as CD replay, Communication etc., an image of Hermit appropriate to each item is displayed.

Figure 11:
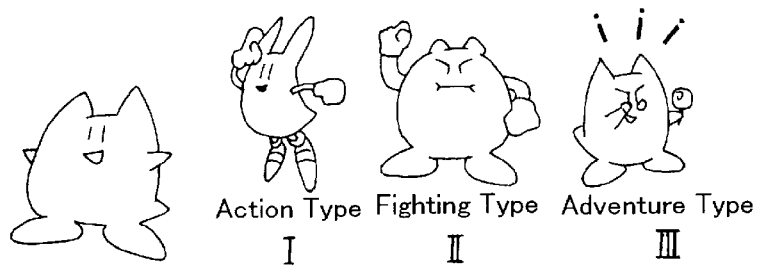
FIG. 11 shows an appearance example of a character generated by a dedicated CPU 102.

FIG. 11 shows examples of the appearances of Hermit generated by the extension program stored in ROM 103 of extension board 101. Each appearance is generated by dedicated CPU 102 corresponding to each application program executed by CPU 1. The appearance may be varied corresponding to the player data.

Depending on each application program, Hermit is displayed with different appearance and size, such as action type I, fighting type II or adventure type III.

Figure 12:
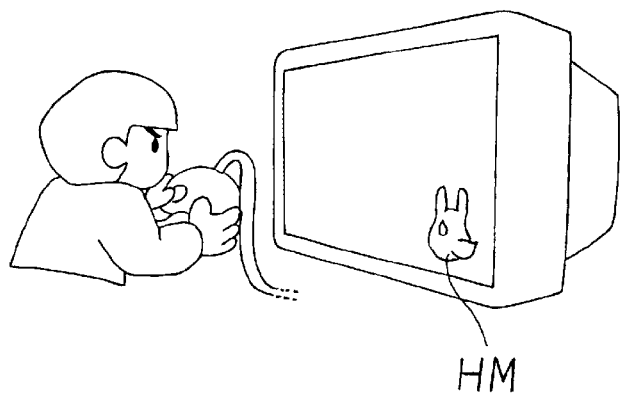
FIG. 12 shows an example of superimposing a character image HM on normal TV pictures.

FIG. 12 shows a further display example of Hermit image HM generated by dedicated CPU 102. Hermit image is superimposed on ordinary TV pictures received by the selected TV tuner 106 in extension board 101 shown in FIG. 8.

Even in this case where the TV tuner is selected for use, the appearance of Hermit may be varied according to the player data by the extension program stored in ROM 103.

Referring back to FIG. 8, the player data stored in main RAM 5 may also be forwarded to a center equipment (not shown) using a communication line through modem 12. Using this method, a company which provides game programs through communication lines can utilize the collected player data as useful information for the company activity.

Figure 13:
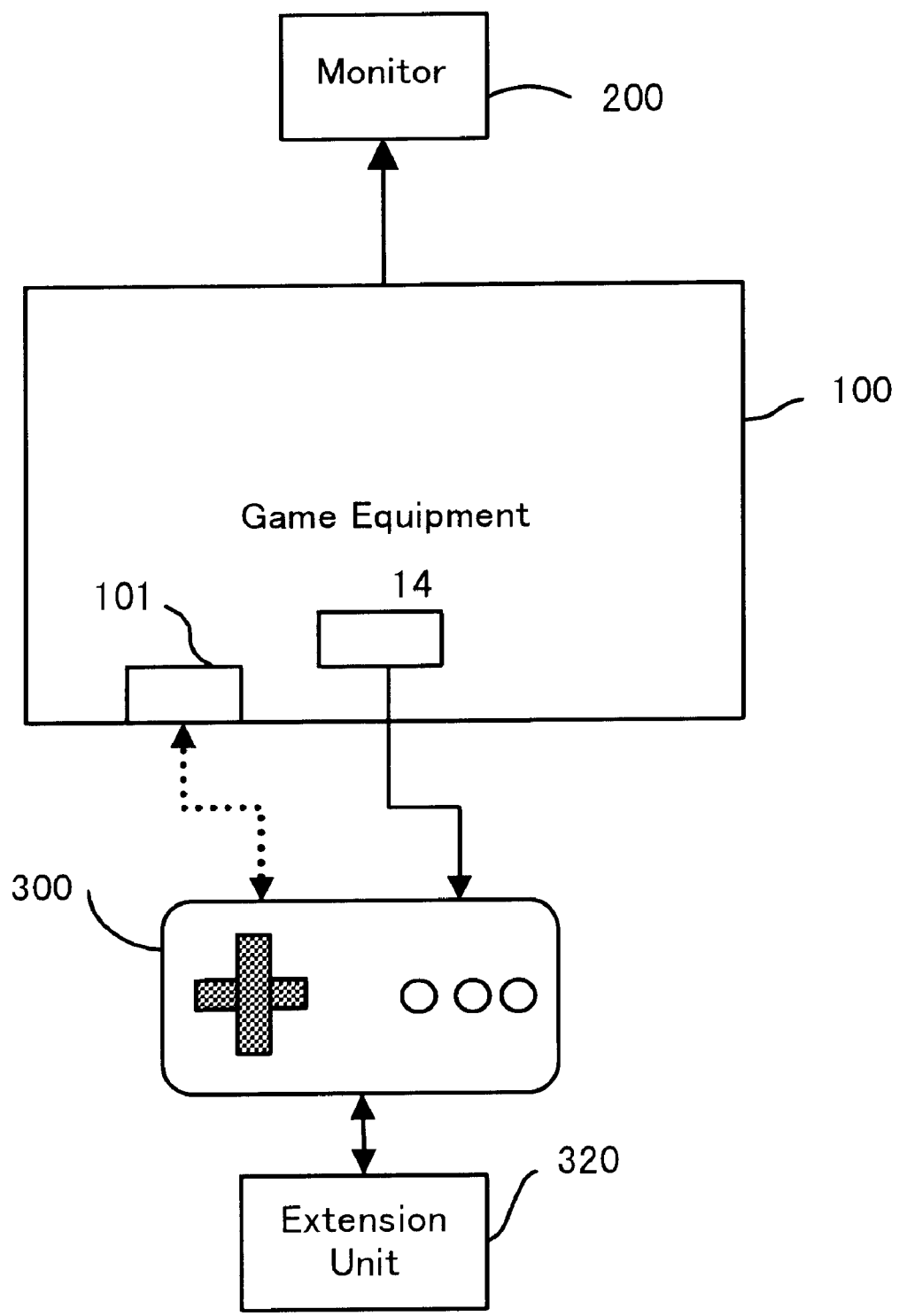
FIG. 13 shows still another embodiment of the present invention.

FIG. 13 shows another embodiment of the present invention. An input controller 300 is connected to connector 14 of game equipment 100 shown in FIG. 8, or an infrared transmitter 101.

In addition, input controller 300 can be connected to various types of extension units 320. As a feature of the embodiment shown in FIG. 13, trends and characteristics of a player in using input controller 300 or extension unit 320 are maintained in the player data, and are reflected to the succeeding game execution.

Figure 14:
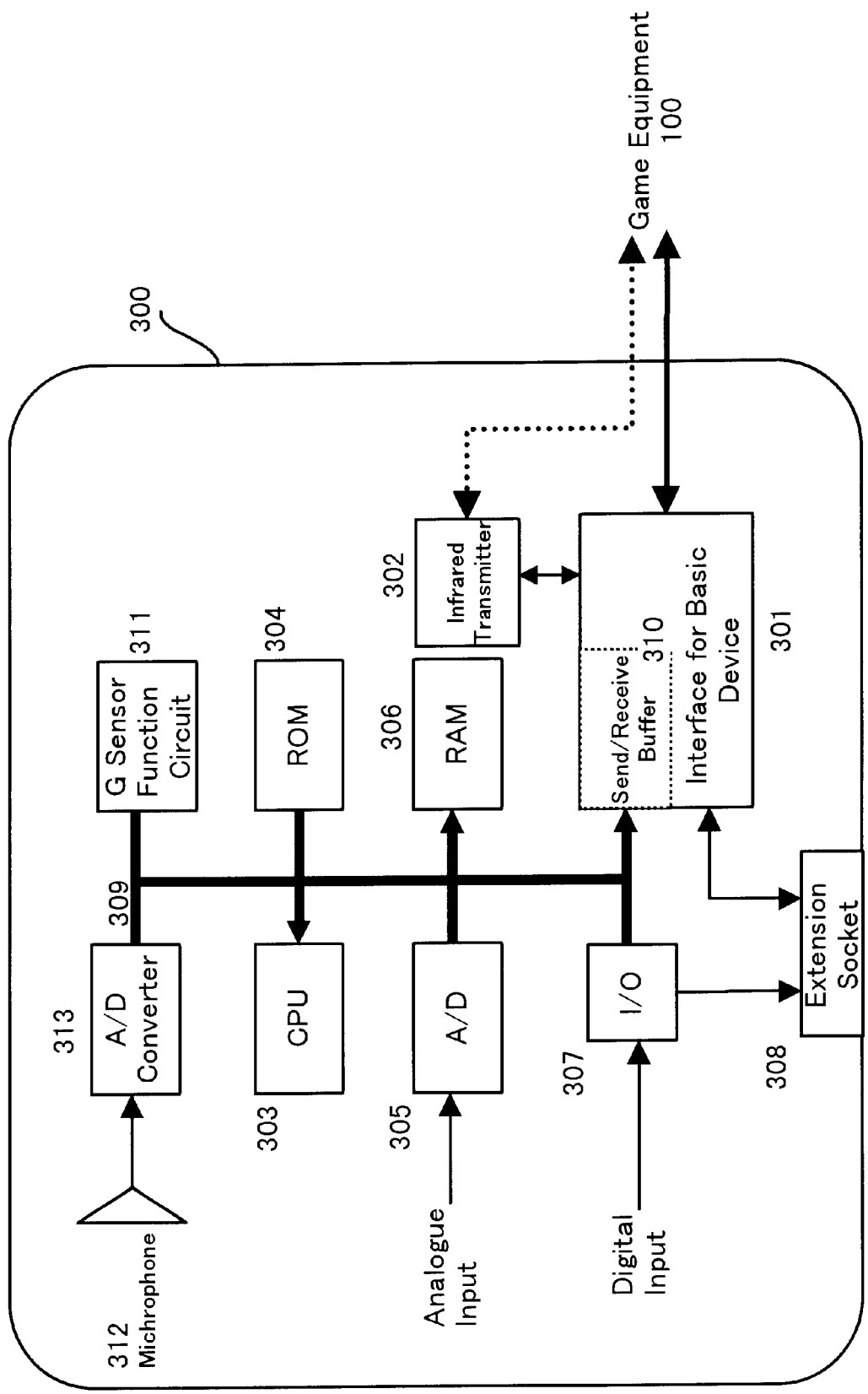
FIG. 14 shows a block diagram of an input controller used for the embodiment shown in FIG. 13.

FIG. 14 shows a block diagram of input controller 300, which is connected to game equipment 100 as shows in this figure. Namely, infrared transmitter 302 of input controller 300 is connected to infrared transmitter 101 of main equipment 100 using infrared wireless communication to transmit and receive data. It may also be possible to connect between connector 14 of game equipment 100 and an interface for basic device 301 to transmit and receive data using a cable.

A send/receive buffer 310 is provided in an interface for basic device 301, so that input controller 300 may buffer data transmitted or received through a bus 309 between each aforementioned element and game equipment 100.

CPU 303 totally controls input controller 300 by a control program stored in ROM 304. An analog-to-digital converter 305 converts, for example, analog input signals from a directional key which is provided in input controller 300 shown in FIG. 13 to digital data. On the other hand, digital input signals from a button switch in input controller 300 are inputted through I/O circuit 307.

Input controller 300 provides a microphone 312 to collect player's voice. The inputted voice is converted to digital data by the second analog-to-digital converter 313.

Input controller 300 also provides a G sensor function circuit 311. For example, G sensor function circuit 311 consists of a pendulum switch function element, which outputs data related to the degree of impact given when input controller 300 is operated, the number of open and shut of a switch, or the vibrational pressure level of a switch.

Such input data are calculated by CPU 303 and are saved into RAM 306 during the game execution. For example, the following data are produced in the above calculation process: the number of times the directional key and each button switch were pressed; the longest time and the shortest time each key was pressed successively; the combination of keys pressed successively; the amount of vibration based on the data obtained by G sensor function circuit 311, etc. Also the number of software resets is included.

At the time the equipment use is being terminated, the data stored in RAM 306 are maintained in RAM 306, or transferred to buffer memory 5 of the main equipment (refer to FIG. 2), as previously explained in regard to FIG. 5 and 6.

When the game equipment is initiated again to restart the game, the player data are read out from RAM 306 in input controller 300 or backup memory 5 of the main equipment, as explained in FIG. 6.

The player data read out can be used as game parameters during the execution of the game program at any suitable time.

For example, these parameters include: the degree of player's experience on the game (which may be recognized as a parameter reflecting a part of player's characters); the condition of equipment handling (data related to whether the equipment has been handled carefully or roughly is estimated from the measured vibration value etc.); and the aging deterioration coefficient (for the use of a possible warning to exchange parts). Also, the player's personal information (name, nickname, etc.) is included.

As explained in FIG. 6, it is possible to reflect the above mentioned game parameters to the program execution. The reflection is conducted in the following way: a difficulty grade of the game execution is automatically determined by the program according to the player s experience value, and if inadequate equipment handling is estimated, a warning for input operation is displayed, or the inputting speed is compulsorily adjusted.

As explained above, in the embodiment shown in FIG. 13, it is possible to provide each input controller 300 with different property corresponding to each player's operation.

Figure 15:
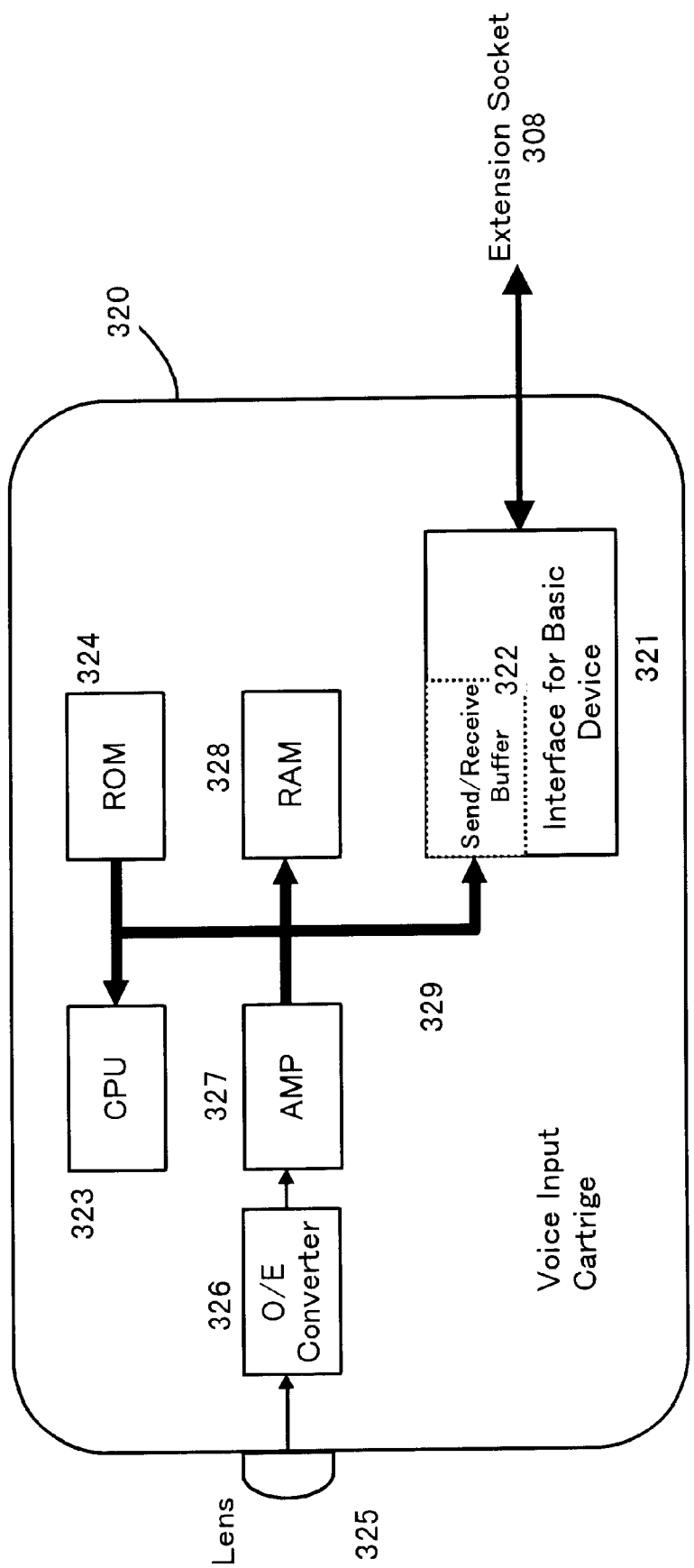
FIG. 15 shows an example of a configuration and a location of an extension unit connected to the input controller shown in FIG. 14.

FIG. 15 shows a block diagram of an extension unit 320 connected to an extension socket 308 shown in FIG. 14. The basic configuration is similar to input controller 300. Namely, CPU 323 totally controls the extension unit by means of the control program stored in ROM 324.

Light emitted from a TV monitor etc. is received through a lens 325 by depressing a switch (not shown), and converted to electric signal by an O/E converter 326 to be inputted through an amplifier 327.

When extension unit 320 is used as a light beam gun, the output timing of an amplifier 327 is sent to input controller 300 via a transmission & reception buffer 322 provided in an interface for extension device 321. The output timing is further sent from input controller 300 to the game equipment, where processing is carried out according to the game program.

Therefore, in the case that extension unit 320 shown in FIG. 15 is used in relate to the embodiment shown in FIG. 13, it is possible to reflect the number of hits etc. to the succeeding game execution. This is carried out by accumulating into RAM 328 the number of light reception timing to be forwarded to input controller 300, in a similar way to the data on the number of switch depressed as explained before.

Having been illustrated using the accompanied drawings, the present invention provides a game execution method and game equipment by the use of a player data, enabling to expand the utilization of a saved data.

There is also provided a game execution method and game equipment enabling to reflect past records of the game execution and a degree of player's skill to a game application program.

Furthermore, as an object of the invention, there is provided a method and game equipment enabling to change contents of an operating system based on past records of the game execution and a player data.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A method for executing a game with game equipment, the method comprising:

retrieving, via an operating system configured to operate different game programs executed by the game equipment, player data that was read our by said operating system in a previous execution of a first game program and stored in a backup memory, said player data including personal data of a player and not including data related to the player's performance and to the player's selected preference data in connection with said first game program; and changing the setting of an interface to said operating system for a second game program, based on said player data, said act of changing being executed prior to the start of the second game program.

2. The method according to claim 1, wherein said setting of the interface is reflected on a screen image during execution of said second game program.

3. The method according to claim 1, wherein said setting of the interface comprises at least one selected from the group consisting of operations, backgrounds, background music (BGM), and effective sounds.

4. The method according to claim 1, wherein said player data is generated based on specified information stored in a memory medium for storing said first game program.

5. The method according to claim 1, wherein the first game program and the second game program are the same.

6. The method according to claim 1, wherein the first game program and the second game program are different from each other.

7. Game equipment comprising:

a controller for controlling the execution of a first game program; and a backup memory detachably coupled to said game equipment, wherein prior to the start of said first game program, said controller retrieves, via an operating system configured to operate different game programs executed by the game equipment, player data that was read out by said operating system in a previous execution of a second game program and stored in said backup memory, and changes the setting of an interface to said operating system for said first game program, based on said player data, said player data including personal data of a player and not including data related to the player's performance and to the player's selected preference data in connection with said second game program.

8. The game equipment according to claim 7, wherein the first game program and the second game program are the same.

9. The game equipment according to claim 7, wherein the first game program and the second game program are different from each other.

10. The game equipment according to claim 7, wherein said setting of the interface is reflected on a screen image provided during execution of the first game program.

11. The game equipment according to claim 7, wherein said setting of the interface comprises at least one selected from the group consisting of operations, backgrounds, background music (BGM), and effective sounds.

12. The game equipment according to claim 7, wherein said player data is generated based on specified information stored in a memory medium for storing said second game program.

* * * * *